United States Patent [19]
Chudi et al.

[11] Patent Number: 6,032,354
[45] Date of Patent: Mar. 7, 2000

[54] APPARATUS FOR MANUFACTURING A ROTOR FOR AN ELECTRIC MACHINE

[75] Inventors: Peter Chudi, Enebyberg; Åke Jönsson, Västerås; Leif Ånger, Hallstahammar, all of Sweden

[73] Assignee: Asea Brown Boveri AB, Sweden

[21] Appl. No.: 08/638,324

[22] Filed: Apr. 26, 1996

Related U.S. Application Data

[62] Division of application No. 08/274,810, Jul. 14, 1994, Pat. No. 5,568,681.

[30] Foreign Application Priority Data

Aug. 13, 1993 [SE] Sweden .................................. 9302629

[51] Int. Cl.$^7$ ................................................. H02K 15/14
[52] U.S. Cl. .............................................. 29/732; 29/759
[58] Field of Search ........................... 29/598, 596, 447, 29/732, 736, 759; 310/42, 156

[56] References Cited

U.S. PATENT DOCUMENTS

4,048,717  9/1977  Piette ........................................ 29/732

*Primary Examiner*—Carl E. Hall
*Attorney, Agent, or Firm*—Watson Cole Grindle Watson, P.L.L.C.

[57] ABSTRACT

A device for manufacturing a rotor for an electric machine, for example, a permanent-magnet excited rotor for a high-speed a.c. machine, the rotor including an inner part constituting a rotor body and an outer part including a capsule tube which, when the rotor is completed, surrounds the rotor body with a shrinkage fit, the device including a counter-support (6) for fixing one of the first and second parts of the rotor in the vertical direction, and a guide channel (7) through which the other of the two parts moves due to gravity against the fixed part.

6 Claims, 5 Drawing Sheets

APPARATUS FOR MANUFACTURING A ROTOR FOR AN ELECTRIC MACHINE

CROSS-REFERENCE TO RELATED APPLICATION

This application is a division of application Ser. No. 08/274,810, filed Jul. 14, 1994, now U.S. Pat. No. 5,568,681.

TECHNICAL FIELD

The present invention relates to a method for manufacturing a rotor for an electric machine, for example a permanent-magnet-excited rotor for a high-speed alternating-current (a.c.) machine, the rotor includes a first part which constitutes a rotor body and which includes a magnetic body and at least one end piece attached to the magnetic body, and a second part, which includes a capsule tube of metallic material. The rotor body is formed, at least partly, as a frustum of a cone with a circular cross section and the internal envelope surface of the capsule tube is formed, at least partly, to constitute a limiting surface for a frustum of a cone with essentially the same conicity as that of the rotor body. The capsule tube, in a completed rotor, surrounds at least parts of the rotor body and under normal operating conditions is fixed thereto by a shrinkage fit.

The device includes a counter-support for fixing one of the invention also relates to a device for accomplishing the method, the first and second parts of the rotor in a vertical direction, as well as a guiding channel through which the other of the two parts is moved against the fixing part.

BACKGROUND ART

When designing machines for high speeds, the peripheral speed of the rotor and mechanical forces associated with this speed constitute a limiting factor for the rotor diameter. For the purpose of obtaining maximum magnetomotive force for a given rotor diameter, the rotor of permanently magnetized electric machines is often designed as a body of permanent-magnetic material with a circular cross section. In this way, a favourable flux distribution in the air gap of the machine, and hence a low harmonic content in the generated voltage, are also obtained. At the ends of the magnetic body end pieces are attached, for example by glueing. The end pieces are preferably of a non-magnetic material and a stub shaft for the rotor is arranged at at least one of them. For reasons of strength the magnetic body is surrounded by a capsule tube, which is also preferably of non-magnetic material. The torque transmission between the magnetic body and the stub shaft takes place via the capsule tube, which is fixed by means of a shrinkage fit to at least parts of the magnetic body and of the end piece at which the stub shaft is arranged. The shrinkage fit is so dimensioned that, under normal operating conditions as regards temperature and speed, it is capable of transmitting any mechanical torques occurring and of limiting mechanical stresses on the magnetic body.

Rotors of the above kind are known from U.S. Pat. No. 4,741,094 and from German published patent application DE 32 24 904 A1.

In U.S. Pat. No. 4,741,094 a rotor body is described which includes a solid cylindrical diametrically magnetized magnetic body arranged between two end pieces of non-magnetic material. The rotor body is surrounded by a cylindrical capsule tube, also of non-magnetic material, arranged with press fit against the magnetic body and parts of the end pieces. The rotor body is first machined into a cylindrical body, whereupon the capsule is heated and the rotor body is cooled. In this way, a difference in diameter is obtained between the two parts, sufficiently great for the parts to be joined together, whereupon the capsule tube is applied around the rotor body. When returning to ambient temperature, a hard press fit is formed between the capsule tube and the rotor body. The heated capsule tube can, however, have a harmful effect on the magnetic properties of the rotor body, and for certain magnetic materials it is necessary to make use of other methods of mounting. The patent shows a device which, by means of hydraulic pressure, brings about the radial extension of the capsule tube which is necessary for the mounting, whereupon the rotor body is inserted into the capsule tube by means of a hydraulic pressure rod. When the pressure is relieved, the elastic extension of the capsule tube is restored, whereby the desired press fit can be achieved.

In German published patent application DE 32 24 904 A1, a rotor is described which includes a rotor body with circular cross section formed of a magnetically conducting midportion, permanent magnets located on different sides of the mid-portion as viewed from the shaft, and a non-magnetic filling material between the mid-portion and the permanent magnets to obtain the circular cross-section. In addition thereto, the rotor includes a capsule tube which surrounds the rotor body and which, by being greatly prestressed, presses the parts included in the body against each other. The shaft of the machine is formed with an end plate which is welded to the capsule tube and serves as an end piece for the rotor. The rotor body is given the shape of a frustum of a cone with a conicity of about 1° and the internal envelope surface of the capsule tube is formed to constitute a limiting surface for a frustum of a cone with the same conicity.

In short rotors, by which are meant in the publication rotors with a length/diameter ratio<3, the capsule tube is pressed onto the rotor body and the intended prestress is checked with the aid of the diameter extension. In long rotors, the necessary pressing force can become so great because of the friction that the pressing on can only be performed with difficulty. Further, the elastic deformation of the capsule tube in the axial direction may lead to unacceptably great differences in the prestressing arising over the length of the rotor. In this case, it is proposed that the capsule tube be heated to make it possible to join the parts together. During the stage of the manufacture when the capsule tube is to be joined to the rotor body and is applied around the magnetic body and the end piece, the following aspects must be considered.

Commonly occurring magnetic materials are anisotropic, which means that their dimensional changes caused by temperature variations lead to deformations of the shape of the magnetic body. A cooling of the magnetic body is therefore unsuitable to achieve the temporary dimensional difference between the magnetic body and the capsule tube which is necessary for joining them together into one unit which limits mechanical stresses on the magnetic body and is capable of transmitting the mechanical torque developed by the machine. On the other hand, the magnetic properties of the magnetic material are sensitive to elevated temperatures, and therefore the temperature to which the capsule tube can be heated and the time during which this can be allowed to cool after having been applied around the magnetic body are limited. Further, the high-tensile steels, which are advantageously used for manufacturing the capsule tube, generally lose their properties, at least partially, when heated above certain temperature limits given by the material. In many applications in practice, it has been found that the temperature restrictions for the magnetic material and for the material of the capsule tube, that is, the upper limit to which the capsule tube can be heated, and which is related to its radial extension, leads to differences in diameter, which are unpractically small for the mounting, between the heated capsule tube and the rotor body if, at the same time, the desired shrinkage fit is to be ensured under normal operating conditions. The problems associated with elevated temperature are avoided if hydraulic pressure is utilized to bring about the desired difference in dimensions, but, on the other hand, requires a relatively complicated device for carrying out the mounting. One expedient is to manufacture the rotor body in the form of a frustum of a cone and to give at least the internal envelope surface of the capsule tube a corresponding conical shape. At least in the case of short rotors, possibilities are then opened in practice to achieve a satisfactory method of mounting the rotor also without heating the capsule tube, and particularly in combination with heating great flexibility is attained in that, because of the conical shape of the rotor parts, the temperature increase of the capsule tube can be limited to values which are harmless to the properties of the rotor. As indicated in the above-mentioned German publication DE 32 24 904 A1, the magnetic body and the capsule tube should therefore be brought against each other with a force controlled in the axial direction in order to attain the resultant shrinkage fit aimed at. Probably in order to limit the required axial force and to be able as far as possible to avoid preheating of the capsule tube, a conicity of about 1° for the rotor body is suggested in the cited publication. However, simple geometrical and electromagnetic considerations show that, if it is desired to avoid the complication involved in designing the stator of the machine with a corresponding conical internal envelope surface, with increasing conicity an increasing air gap is obtained at the minor end of the rotor with a corresponding decreasing magnetic utilization of the machine. This circumstance is strengthened by the fact that rotors of this kind, which in view of their high speeds are suitably designed with a relatively small diameter and a large axial length, and by the fact that the capsule tube for reasons of strength must have its greatest wall thickness at the major end of the rotor. The cited publication DE 32 24 904 A1 only indicates that a force is applied to either the capsule tube or the rotor body to join these parts together, but to bring about a sufficient and controllable force, some form of device for achieving a controlled force must be visualized. Obvious solutions, for example a compressed-air cylinder influencing the rotor body, are, however, less suitable in that the initial acceleration on the relatively brittle magnetic body becomes high and uncontrolled, with a risk of damage to the magnetic body during mounting, if the cylinder is not provided with controlling and checking devices for its movement. In a device of this kind, where the mounting takes place with the shaft of the rotor body in the horizontal plane, the fact that the rotor body, under the influence of the force of gravity, slides on a generatrix in the capsule tube when the parts are moved against each other must also be considered.

SUMMARY OF THE INVENTION

It is an object of the invention to provide an improved method for manufacturing rotors of the kind described in the introductory part of the description, as well as a device for carrying out the method.

According to the invention, the improvement is achieved by vertically orienting the axes of the rotor body and the capsule tube when joining them together, and the force necessary for joining these parts together is achieved by the gravitational acceleration.

In one advantageous embodiment, the capsule tube is preheated and then, when the parts have been joined together, again cooled by forced cooling.

Advantageous further developments of the invention will be clear from the following description.

According to the invention, an acceleration process favourable for the joining is achieved in a simple manner, without special devices for power generation, while at the same time the control of the relative motions of the rotor body and the capsule tube can be achieved in a simple manner without the mentioned components having to contact each other until they achieve the desired engagement.

Also the deceleration process is favourable according to the invention, since it is affected by the gravitational acceleration and by frictional forces between the rotor body and the capsule tube.

BRIEF DESCRIPTION OF THE DRAWINGS

The invention will be explained in greater detail by description of embodiments with reference to the accompanying drawings, wherein.

DESCRIPTION OF THE PREFERRED EMBODIMENTS

The following description relates both to the method and to the device for carrying out the method.

The rotor and the device, shown in the figures, for carrying out the method according to the invention are drawn with proportions which for the sake of clarity are not according to scale, and it is to be understood that the figures only show the design illustrating the principle of the invention.

The initial position for the method is a rotor body and a capsule tube therefor. The rotor body includes a magnetic body with circular cross section and at least one end piece, preferably of a non-magnetic steel, attached to the magnetic body at one end thereof, for example by glueing. The capsule tube is a tube with circular cross section, preferably of a non-magnetic steel. An additional end piece may be attached either to the other end of the magnetic body or to the capsule tube. At least one of the end pieces exhibits a stub shaft. The rotor body has been given the shape of a frustum of a cone, for example by grinding. The conicity may preferably be of the order of magnitude of 0.05°. The internal envelope surface of the capsule tube has been given a conical shape, for example also by grinding, which essentially corresponds to that of the rotor body. The task is to apply the capsule tube to the rotor body and fix the capsule tube thereto with a shrinkage fit such that the capsule tube, with the rotor mounted in a stator intended therefor, under normal operating conditions is capable of limiting the mechanical stresses on the magnetic body and of transmitting the mechanical torques which influence the magnetic body to an end piece which is provided with a stub shaft.

Figure 1:
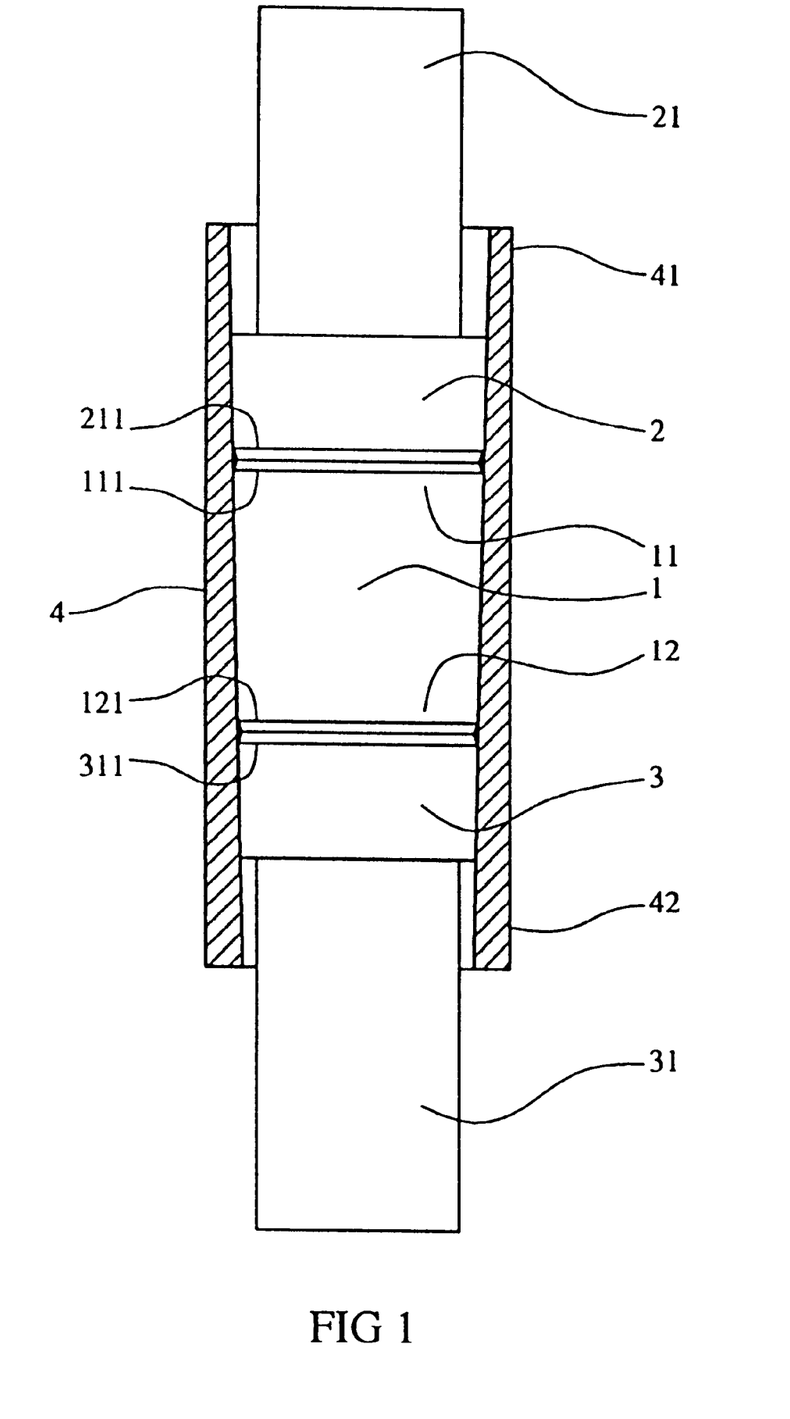
FIG. 1 shows an embodiment of a rotor of the intended kind.

FIG. 1 shows a rotor of the intended kind, in which the conicity for the sake of clarity is drawn greatly exaggerated. A magnetic body 1 with circular cross section and which is diametrically magnetized has, at its major end 11, a first end piece 2, fixed by glueing, with a first stub shaft 21, and at its minor end 12 a second end piece 3, also fixed by glueing, with a second stub shaft 31. A capsule tube 4 is applied around the rotor body so as to make contact with the magnetic body and the two end pieces with a shrinkage fit. Both the magnetic body and the end pieces are provided with bevels at their confronting surfaces, these bevels being designated 111, 211, 121, 311 in the figure. That part of the capsule tube which corresponds to the major end of the rotor body, and which thus has the largest inner diameter, is designated in the figure with the reference numeral 41 and the other end of the capsule tube is designated 42. The capsule tube is longer than the rotor body including the end pieces, and the capsule tube and the rotor body are located, in the axial direction, in such a way in relation to each other that the capsule tube extends somewhat over each one of the end pieces.

Figure 2A:
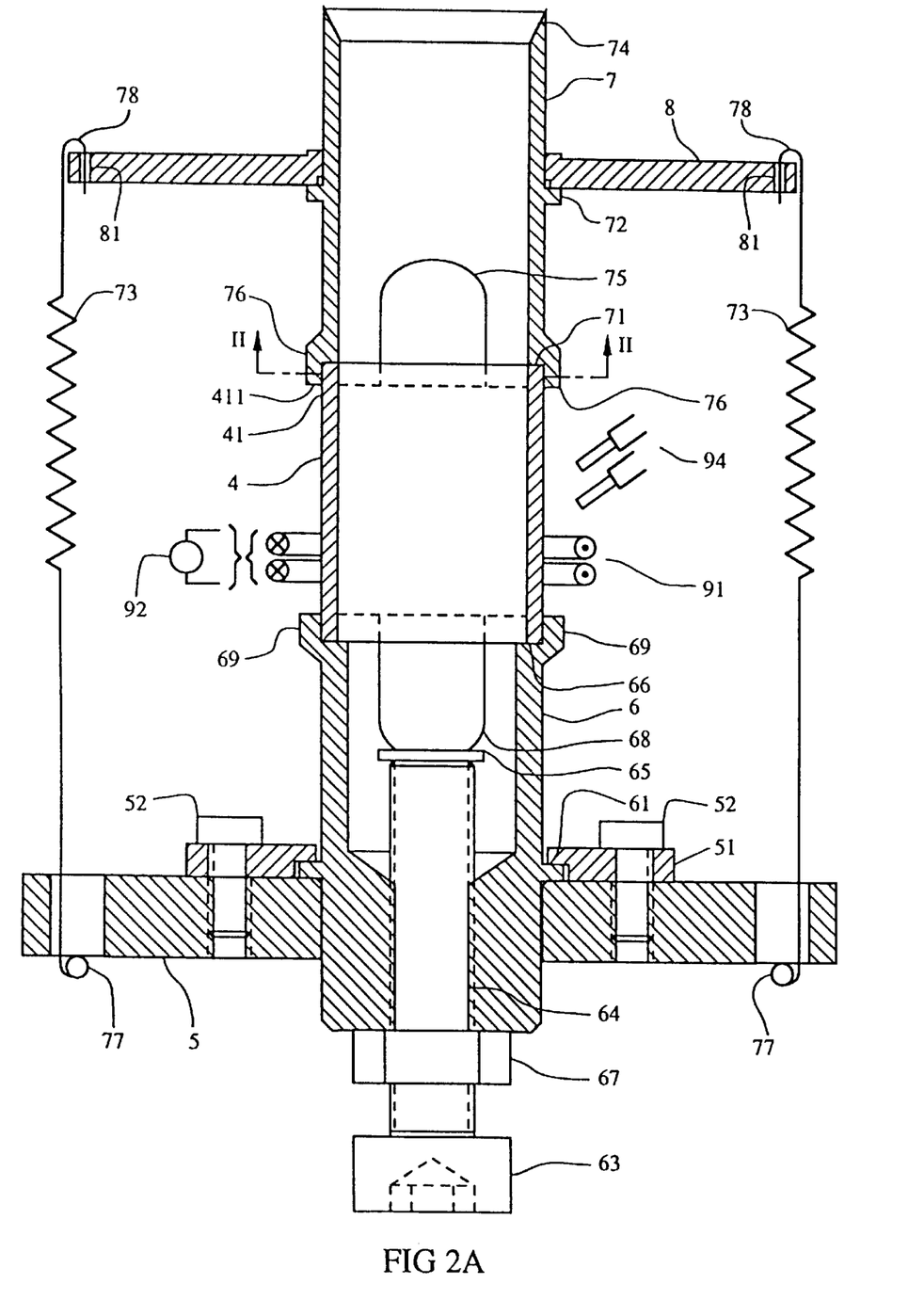
FIG. 2A shows a longitudinal section of an embodiment of a device for carrying out the method according to the invention.

FIG. 2A shows a longitudinal section of a device for carrying out the method in the form of a mounting rig. A plane horizontal plate 5, which for example may be part of a table, supports a counter-support 6. A locking ring 51 makes contact with a first flange 61 formed in the counter-support, which is attached to the plate by means of bolts 52 through the locking ring. The counter-support is shaped as a tube with a circular cross section and a stop device in the form of a counter-support bolt 63 of socket head cap screw type can be screwed from below through a threaded hole 64 in the counter-support. The counter-support bolt can be locked in its position with a nut 67. A damping device 65, in the form of a plane washer of lead, is arranged at the upper end of the counter-support bolt in the figure. The capsule tube 4, with its internal envelope surface machined to correspond to the shape of a frustum of a cone, is placed in a chamfered portion 66 at the upper end of the counter-support. At that part of the counter-support which in the figure is shown as the upper part, facing the capsule tube, the counter-support is formed with three slots 68, of which only one is shown in FIG. 2A, such that part of the counter-support which makes contact with the capsule tube will exhibit three fingers 69, which grip the capsule tube. By a suitable dimensioning of the fingers, the advantages are obtained that the counter-support, by the fingers being resilient in the radial direction, allows the capsule tube upon heating to expand in the radial direction, and that the heat quantities which by conduction can flow between the capsule tube and the counter-support, when the former is heated and cooled, are minimized. The capsule tube is oriented such that that end, which during machining into conical shape has been given the largest diameter, is placed upwards. Thereafter, a guide tube 7 with circular cross section is placed on the capsule tube, the lower end of the guide tube exhibiting a second flange 71. At its upper end the guide tube exhibits a funnel-shaped bevel 74 and at its lower end it is formed with three slots 75, of which only one is shown in FIG. 2A, such that that part of the guide tube which makes contact with the capsule tube will exhibit three fingers 76, which grip around the capsule tube. The fingers 76 make contact with a machined surface 411 on the capsule tube. By a suitable dimensioning of the fingers, the advantages are obtained that the guide tube, by the fingers being resilient in the radial direction, allows the capsule tube upon heating to expand in the radial direction, and that the heat quantities which by conduction can flow between the capsule tube and the guide tube, when the former is heated and cooled, are minimized.

The guide tube and the capsule tube are then clamped against the counter-support by means of a circlip 8, which makes contact with a third flange 72 formed in the guide tube. The circlip is clamped with resilient elements 73, in the figure schematically shown as helical springs, which at their lower ends are fastened to the plate 5, in a manner which is only indicated in the figure, at a fixing member 77 and are then hooked onto the circlip, for example by means of hooks 78 in holes 81 in the circlip provided for the purpose. In this way, the capsule tube will be fixed, in the vertical direction, in relation to the counter-support and be clamped with a resilient force between the counter-support and the guide tube. It is important that the clamping of the capsule tube is performed to comprise some form of resilience in the axial direction such that the axial dimensional change of the capsule tube upon heating and cooling can be absorbed by the mounting rig.

Figure 2B:
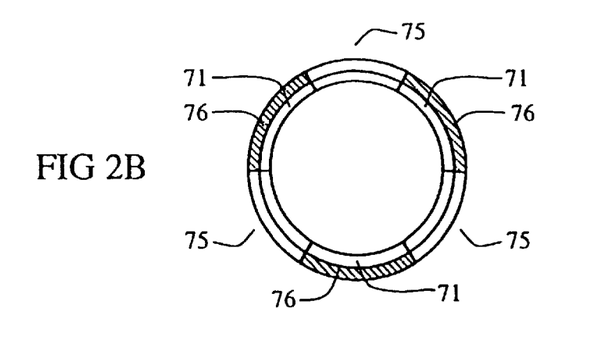
FIG. 2B shows a cross section of the device in FIG. 2A.
Figure 2C:
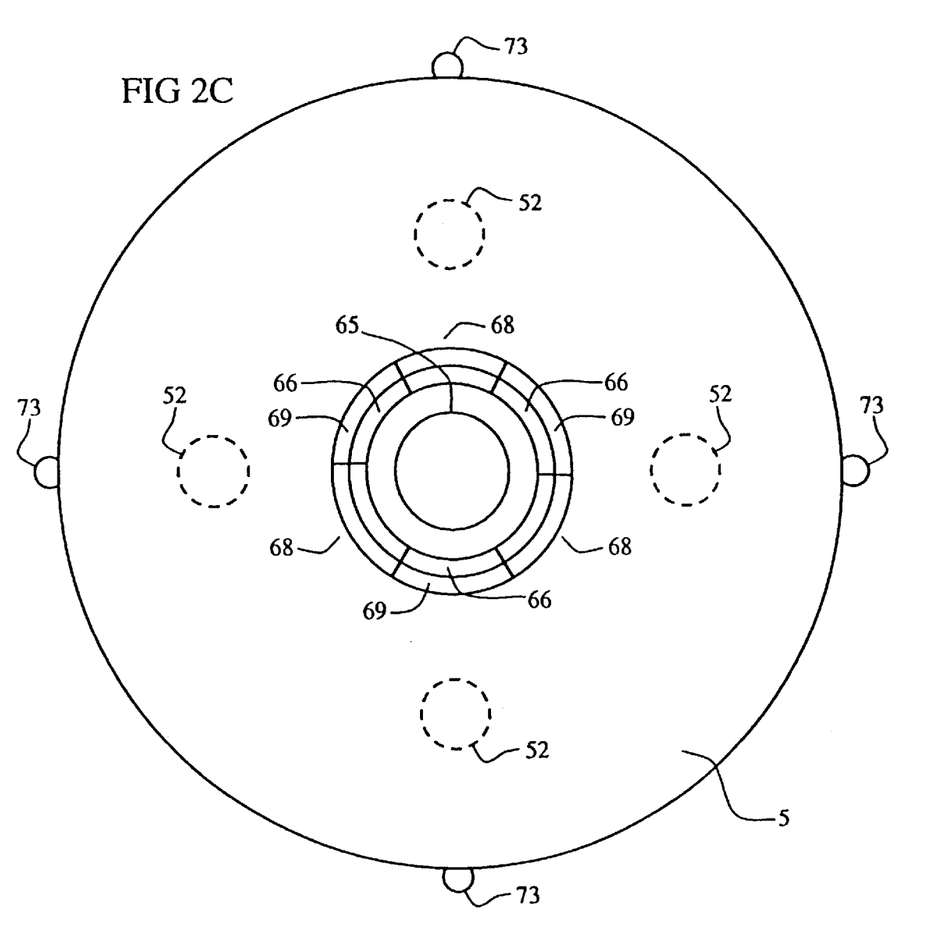
FIG. 2C shows an end view of the device in FIG. 2A, and FIGS. 3A to 3E show a measuring method for setting a stop device in the device according to FIG. 2A.

FIG. 2B shows the guide tube as viewed from the section II in FIG. 2A. FIG. 2C schematically shows the counter-support as viewed from above with the disc 5 shown as a circular disc.

The counter-support bolt 63 is screwed into the counter-support to a level determined according to a method which will be described below, and is locked with the nut 67, whereupon the capsule tube 4 is heated to a predetermined temperature, preferably by inductive heating by means of a heating device known per se, which in FIG. 2A is marked with a coil 91 which surrounds the capsule tube and which is fed by a controllable a.c. source 92. When the capsule tube is judged to have attained a predetermined temperature, which can be determined with knowledge of the energy supplied to the coil 91 or in some conventional way for temperature measurement, the heating is interrupted.

The rotor body, which is then placed over the guide tube with its minor end directed substantially vertically downwards and secured in some way known per se, is now released and first falls through the funnel-shaped bevel 74 of the guide tube and then further down through the guide tube into the capsule tube. In the capsule tube the movement can be completely or partially slowed down by friction between the diameter of the capsule tube, which is internally decreasing in the axial direction, and the increasing diameter of the rotor body. The movement of the rotor body is limited by the stop device and in the event that the movement has not previously ceased through the influence of the frictional forces, it stops by the stub shaft 31 making contact with the damping device 65 on the counter-support bolt. During this braking procedure, a small conicity gives a relatively low and hence, from the point of view of strength, favourable retardation. It should also be noted that, in case of a prescribed tolerance in the final shrinkage fit, a decreasing conicity entails an increasing tolerance as far as the relative positions of the rotor body and the capsule tube are concerned when the movement has ceased. Thus, it is not a necessary condition that the movement be limited by the stop device for the finished rotor to exhibit an acceptable shrinkage fit, but also in the event that the rotor body is brought to a standstill within a certain distance above the stop device, the rotor can be approved. The air which, prior to the start of the movement, is contained in the interior of the counter-support, is forced by the rotor body out through the slots 68, through which it is also possible to inspect the position of the stub shaft relative to the stop device.

As soon as the movement of the rotor body has been braked and stopped, a cooling system for the capsule tube can advantageously be activated such that the heat quantity which is discharged from the capsule tube to the magnetic body is minimized. This forced cooling can be carried out by direct spraying by means of a coolant, for example water, from nozzles 94 arranged at the capsule tube, which in FIG. 2A are schematically marked and connected to a feeding system, not shown in the figure. When the capsule tube has cooled, the forced cooling is interrupted, whereupon the spring elements can be detached and the finished rotor be removed from the mounting rig.

Figure 3A:
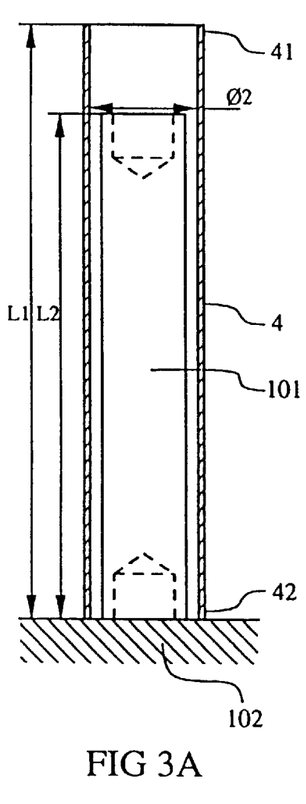
Figure 3B:
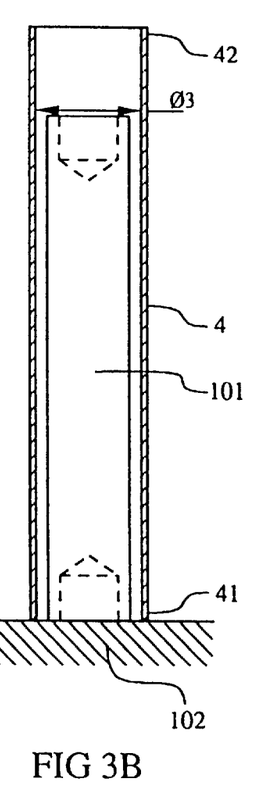
Figure 3C:
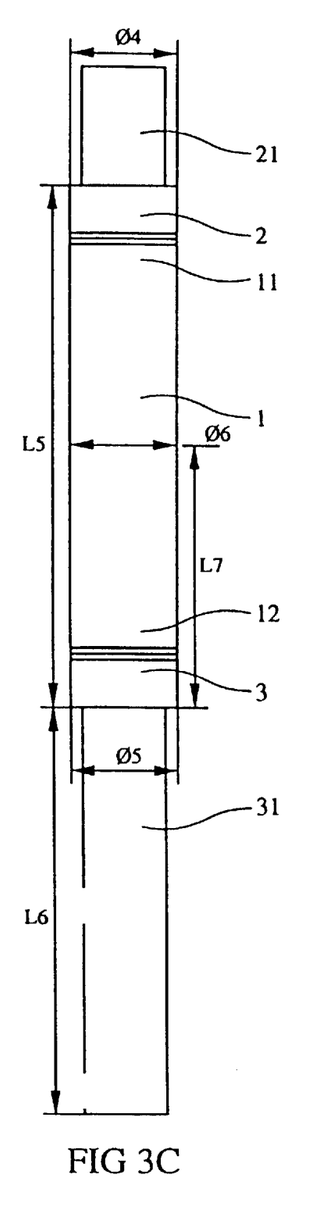

Although, as stated above, it can be accepted that the movement of the rotor body stops within a certain tolerance region for the relative position between the rotor body and the capsule tube in order to obtain a desired grip, at operating temperature, between the capsule tube and the rotor body, it is advantageous to limit the movement at a controlled mutual position between these two components. This is done by setting the counter-support bolt according to a method which is to be described with reference to FIGS. 3A–3E. The aim of the method is that the capsule tube, when the movement has ceased due to contact between the stub shaft and the damping device, in the axial direction shall be located symmetrically over that part of the rotor body which consists of the magnetic body and the end pieces, whereby a desired grip between the rotor body and the capsule tube is to be achieved under normal operating conditions. As a first step, the capsule tube is measured after having been internally machined into the desired conical shape. This measurement is performed by placing the capsule tube over a cylindrical mandrel 101 (FIGS. 3A–3B), placed on a measuring table 102, suitably a measuring table of diabase designed with good flatness. According to FIG. 1A, the inside diameter $\phi 2$ of the capsule tube is measured at that end 41 of the capsule tube which exhibits the larger inside diameter, whereafter the capsule tube is turned and again placed across the mandrel and, according to FIG. 1B, the inside diameter $\phi 3$ of the capsule tube is measured at that end 42 of the capsule tube which exhibits the smaller inside diameter. The measurement can suitably be carried out by means of a three-point micrometer, the measuring lugs of which, which have known dimensions, are placed against the upper basis of the mandrel. This means that the inside diameters $\phi 2$ and $\phi 3$ are measured at known distances from the opposite end of the capsule tube since the dimension of the axial extension of the mandrel, marked with L2, is also known. The fact that the inside diameters $\phi 2$ and $\phi 3$ are measured at a level somewhat above the level of the upper basis of the mandrel has been indicated in the figure by the location of the dimensional arrows for respectively $\phi 2$ and $\phi 3$. The dimension L1 of the axial length of the capsule tube is known from the manufacture of the capsule tube. The dimension L5 of the length of the magnetic body 1 including the end pieces 2 and 3, the dimension L6 of the length of the stub shaft 31 at the minor end of the rotor body and the diameters $\phi 4$ and $\phi 5$, respectively, of the end pieces, according to FIG. 3C, are known from the manufacture of the rotor body. Then, a diameter $\phi 6$ is calculated as the diameter at the mid-point of the capsule tube plus the grip D$\phi$ which under normal operating conditions is desired between the rotor body and the capsule tube. The diameter $\phi 6$ is calculated from the equation $\phi 6=(\phi 2-\phi 3)/2++\phi 3+D\phi$. The diameter $\phi 6$ is located on the rotor body at a distance L7 from its minor end (FIG. 3C). The dimension L7 can be calculated from the equation $L7=L5 * (\phi 6-\phi 5)/(\phi 4-\phi 5)$.

Figure 3D:
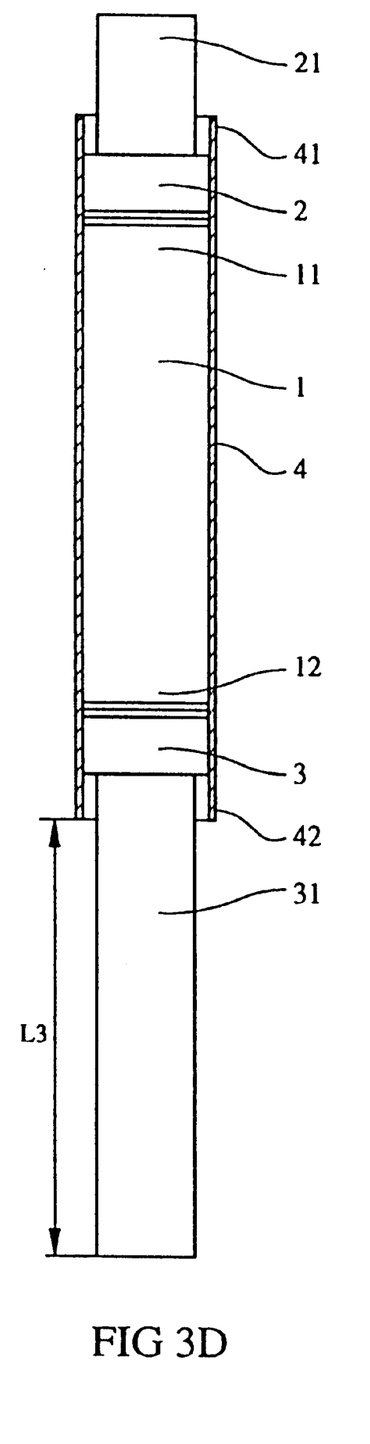
Figure 3E:
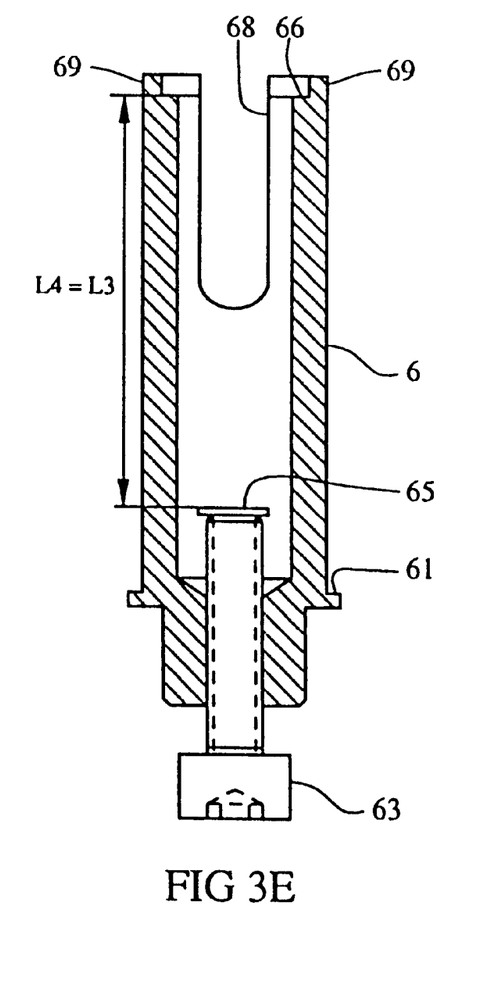

Further, the dimension L3 according to FIG. 3D is calculated as the distance between the capsule tube and the free end of the stub shaft 31 at the minor end, which is indirectly a measure of the extent to which the capsule tube is to extend beyond the end piece 3 at the minor end. With the dimensions L1 and L6 known, the dimension L3 can also be determined from the equation $L3=L7+L6-L1/2$. As is realized from FIG. 3E and from the description with reference to FIG. 2A, the dimension L3, with the conditions given, shall also correspond to the dimension L4 in FIG. 3E, that is to say, the distance between the bevel 66 at the upper end of the counter-support and the upper part of the damping device 65. Thus, the counter-support bolt is to be screwed into a position where the mentioned distance L4 becomes equal to the calculated distance L3.

In a typical embodiment, the length of the capsule tube is L1=200 mm, its outside diameter 42.4 mm, its inside diameter at the major end $\phi 2$=35.17 mm and at the minor end $\phi 3$=34.88 mm, the length of the rotor body including end pieces L5=168 mm. The diameters of the end pieces at the major end are $\phi 4$=35.30 mm and at the minor end $\phi 5$=35.06 mm and the length of the stub shaft at the minor end is L6=133.5 mm. With a desired grip D$\phi$=0.2 mm, the following is obtained according to the above: $\phi 6$=35.225 mm and L5=115.5 mm and L3=L4=149 mm. In this case, the guide tube may have a length of 415 mm and the length of the counter-support above the disc 5 may be 140 mm.

The invention is not limited to the embodiments shown but a plurality of modifications are feasible within the scope of the inventive concept.

The rotor body can be simply manually moved down into the guide tube and be released from a specific position, for example when the upper basis of the end piece 2 is on a level with the upper edge of the guide tube, but it is also possible, for example by means of a robot, to pick rotor bodies from a pallet store, in which case the robot suitably grips the rotor body by its stub shaft 21 arranged at the major end and in a corresponding way inserts them into the guide tube, the vertical movement being initiated by the robot receiving an impulse to release the grip around the stub shaft It is also possible to fix the rotor body with its minor end facing upwards in a vertical direction relative to a counter-support in the form of a plate, possibly with an opening for the stub shaft and to allow the capsule tube under the influence of the gravitational acceleration to fall down over the rotor body. The stop device can then, for example, be designed as an annular element located around the rotor body, in a vertical direction below that envelope surface of the end piece 2 which faces away from the magnetic body. The distance in a vertical direction is set so as to correspond to the distance over which the capsule tube, when the rotor is mounted, is to extend beyond that envelope surface of the end piece 2 which faces away from the magnetic body. Before being released, the capsule tube can thereby be oriented with its axis to essentially coincide with that of the rotor body by means of, for example, a guide channel formed from rollers.

Although in many cases it is preferable that the capsule tube be heated before the joining, the invention can also advantageously, as explained above in connection with the description of the mounting rig, be used in those cases where a satisfactory dimensioning can be obtained without heating.

The method can be applied generally to rotors, the rotor body of which has been given the shape of a frustum of a cone, thus also, for example, when the rotor body comprises permanent magnets, joined together in some way known per se, in the form of parallelepipeds or in some other form.

Under certain circumstances it may be advantageous to design the rotor body to comprise a magnetic body and only one of the two end pieces, in the embodiment shown the end piece 2, whereas the other end piece is fixed to the capsule tube before the rotor body and the capsule tube are joined together according to the invention.

The magnetic body with the end piece or end pieces attached thereto may, of found suitable, be designed with a centrally located, axially continuous hole.

The heating of the capsule tube can also be performed by means of a body, applied around the capsule tube, of a material with good thermal conductivity, for example copper, which body is then preferably provided with channels for supplying a coolant for rapid cooling.

The resilient elements 73 and the attachment thereof to the circlip and the disc 5 can, of course, be designed in different ways, as well as the damping device 65. The disc 5 and the counter-support 6 can also be designed as one unit and/or the circlip 8 and the guide tube 7 be designed as one unit such that the resilient elements exert their spring force direct between the circlip and the counter-support or direct between the guide tube and the counter-support. The resilient elements 73 may, of course, be designed in some other way other than as helical springs.

We claim:

1. A device for manufacturing a rotor for an electric machine, the rotor including a first part formed of a rotor body which comprises a magnetic body and at least one end piece, and a second part formed of a capsule tube of metallic material, the device comprising a counter support for fixing one of the first and second parts of the rotor in a vertical direction, and a guide channel through which the other of the two parts moves downwardly and against the fixed part under the exclusive influence of gravity.

2. A device according to claim 1, including a heating device (91, 92) for heating the capsule tube.

3. A device according to claim 2, including means for forced cooling of the capsule tube.

4. A device according to claim 1, wherein the capsule tube is fixed in relation to the counter support and the guide channel consists of a guide tube (7) through which the rotor body moves under the influence of gravity against the capsule tube, and including a stop device (63,65) for limiting the downward movement of the rotor body.

5. A device according to claim 4, including resilient elements (73) between the counter support and the guide tube for fixing the capsule tube against the countersupport.

6. A device according to claim 4, including an adjusting screw (63) for setting a vertical position of the stop device, and a damping device (65) against which the downward movement is limited.

* * * * *

UNITED STATES PATENT AND TRADEMARK OFFICE
CERTIFICATE OF CORRECTION

PATENT NO. : 6,032,354
DATED : March 7, 2000
INVENTOR(S) : Peter Chudi, et al

It is certified that error appears in the above-identified patent and that said Letters Patent is hereby corrected as shown below:

On the title page, item [73] Assignee should read

-- Asea Brown Boveri AB, Västerås, Sweden --

Signed and Sealed this

Twenty-eighth Day of November, 2000

Attest:

Q. TODD DICKINSON

*Attesting Officer*    *Director of Patents and Trademarks*